Aug. 5, 1941.　　　G. A. TINNERMAN　　　2,251,723
SPRING NUT FASTENER OR THE LIKE
Filed May 17, 1940　　　2 Sheets-Sheet 2

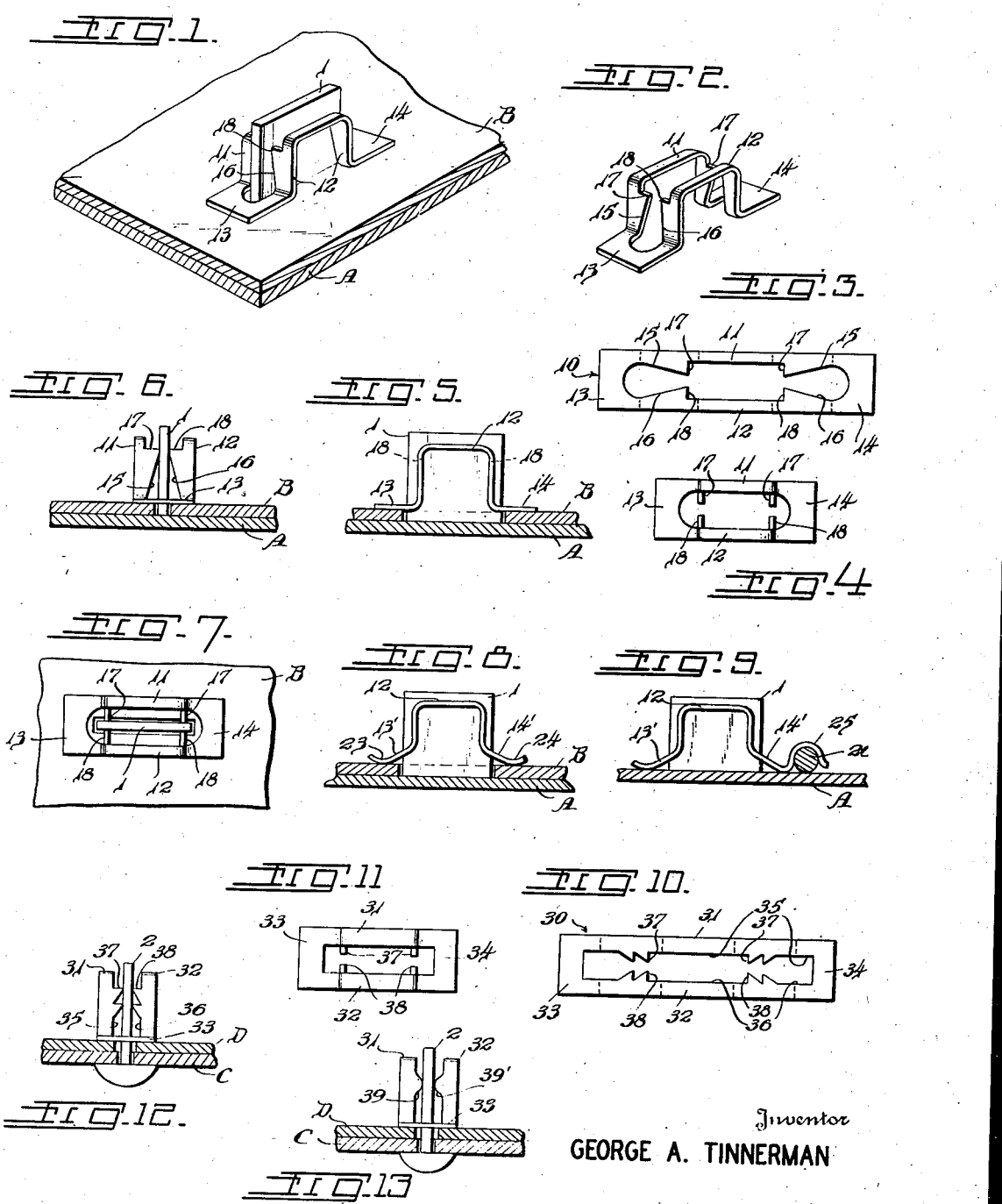

Inventor
GEORGE A. TINNERMAN
By H. J. Lombard
Attorney

Patented Aug. 5, 1941

2,251,723

UNITED STATES PATENT OFFICE 2,251,723

SPRING NUT FASTENER OR THE LIKE

George A. Tinnerman, Cleveland, Ohio, assignor to Tinnerman Products, Inc., Cleveland, Ohio, a corporation of Ohio Application May 17, 1940, Serial No. 335,835

23 Claims. (Cl. 85—36)

This invention relates in general to spring fasteners such as spring nuts, or the like, which are adapted to provide a quick and easy assembly of parts to be secured and an effective reliable fastening installation of such parts under continuously effective spring tension.

More particularly, the present invention is directed to an improved form of simple and inexpensive sheet metal spring fastener embodying a new and novel construction for providing securing elements which engage a stud or the like connecting means at a plurality of spaced points on its periphery under tension exerted by forces acting, more especially, along lines generally normal to the axis of the stud. The improved fastener construction of this character provides for a pronounced and positive gripping action of the securing elements of the fastener with the connecting stud in a manner to ensure an effective and reliable fastening installation in which the parts secured are not subject to loosening or displacement even under extreme conditions of shock, vibratory motion, jarring effects, and the like.

The various fastening installations disclosed herein embodying the improved fastener of the present invention are of general utility and have a wide range and variety of uses in that practically any part to be secured whether plastic, metal, wood or composition material, may be expediently provided with a suitable form of connecting stud means, and particularly in the manner of a generally flat connecting stem or equivalent rib section, or the like.

In this respect, in addition to numerous advantages in manufacture and handling, a most important problem is solved in the provision of certain widely used types of molded plastic parts with means for securing the same in an installation while also producing such plastic parts without mold imperfections such as shrinkage marks, porous rough spots, gas cavities, etc. For example, many parts constructed of plastic materials are of such form as to embody considerable width and length and yet a relatively thin thickness. In the molding of such a plastic part, therefore, only a certain size connecting stud means will be satisfactory since if the connecting stud is of a thickness or diameter greater than the adjacent thickness of the plastic part, generally speaking, the plastic material frequently will not flow properly to form the connecting stud with the result that such stud will be only partly formed, fragile or otherwise imperfect to the extent the entire molded plastic part is useless inasmuch as it cannot be fastened properly in the manner intended. Furthermore, when such a molded plastic part of relatively thin thickness is cooled to hardened form, if the stud is of greater diameter than such thickness, a shrinkage takes place in the area of the stud itself causing the adjacent material of the plastic part to contract and form an objectionable dimple on the exposed finish surface thereof.

It has been found that any such mold imperfections may be avoided and the connecting stud means on a plastic part otherwise satisfactorily provided so long as the diameter or thickness thereof is less or not materially greater than that of the thickness of the adjacent area of the plastic part itself. This, of course, often requires that the connecting stud be of very thin cross-section and in order to adapt the same for the required strength, such connecting stud is best provided in many cases in the manner of a generally flat connecting stem or rib section integrally provided on the underface of the plastic part and therefore not necessarily visible from the exposed finish surface thereof. In this respect, similar connecting stud means, of course, may be readily provided on a wood or metal member while in the case of a sheet metal part, an equivalent form of connecting stem, or the like, may be provided by a simple tongue element which is struck therefrom, welded, riveted or otherwise secured thereto in any suitable manner.

A primary object of the present invention, therefore, is to provide various fastening installations embodying a part having any such connecting stud means or the like together with an improved form of spring fastener which is simple, inexpensive and particularly adapted for easy and quick application to secure such an installation effectively and reliably in the manner of a spring nut or related form of attaching or connecting fastener device.

Another principal object of the invention is for the provision of a spring fastener of this character comprising cooperating securing elements having a pronounced gripping action with such connecting stud means in a manner to engage the same on opposite faces thereof under forces acting generally normal to the axis of the stud to provide a substantially positive locked fastening installation.

A more specific object of the invention contemplates the provision of such a fastener comprising securing elements designed to engage opposite faces of a connecting stud in the form of a generally flat stem, rib section or the like, by substantial spring gripping action at a plurality of spaced points and further, with such securing elements including an improved, highly effective form of anchoring means of relatively simple construction making for economy in the manufacture of such fasteners and speed and facility in the application and general use thereof in a wide range and variety of installations.

A further more specific object is for the provision of a spring fastener of the kind aforesaid which is provided with additional means for attaching the same in an opening in a supporting part while securing a cooperating part thereto by means of a connecting stud engaged by the securing elements of the fastener.

A further object of the invention is to provide various forms of such fasteners in the manner of simple, one-piece, sheet metal devices which are cheap and inexpensive to provide and lend themselves to economical quantity production in that they may be produced at relatively low cost from ordinary sheet metal strip stock with little loss or waste of material.

Further objects and advantages and other new and useful features in the construction, arrangement and general combination of parts of the invention will be readily apparent to those skilled in the art as a description thereof proceeds with reference to the accompanying drawings, for purposes of illustration but not of limitation, in which like reference characters designate like parts throughout the same, and in which:

Fig. 1 is a perspective view of a simple fastening installation in which cooperating parts are held together by a connecting stud with the improved fastener of the invention applied to the projecting free end portion of the stud to fasten such parts in the manner of a spring nut;

Fig. 2 is a perspective of a preferred form of the fastener shown employed in Fig. 1;

Fig. 3 represents the general form of blank or stamping from which the fastener shown in Fig. 2 is constructed;

Fig. 4 is a top plan view of the fastener per se as bent to completed form from the blank of Fig. 3;

Fig. 5 is a sectional view of the installation of Fig. 1 in which the fastener is shown in side elevation;

Fig. 6 is a similar view showing the fastener in end elevation; and,

Fig. 7 is a top plan view of Fig. 6.

Fig. 8 is a sectional view of an installation in which the fastener is provided with a modified construction of the base portions thereof;

Fig. 9 shows another modification in which the fastener is provided with article holding means;

Figs. 10 to 12 inclusive show another embodiment of the invention in which the fastener is constructed from a blank or stamping such as illustrated in Fig. 10;

Fig. 11 is a top plan view of the completed fastener constructed from the blank of Fig. 10; and, Fig. 12 is a sectional view of an installation in which the fastener of Fig. 11 is shown in end elevation as applied to a connecting stud provided by a generally flat rivet or the like, for example.

Figure 16:
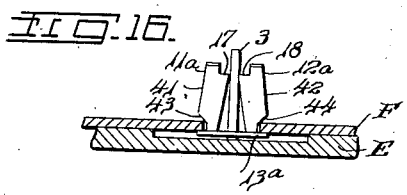
Figure 14:
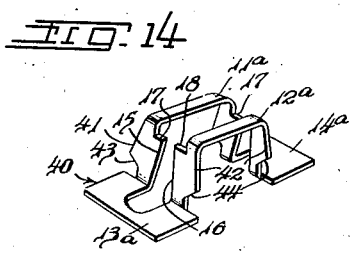
Figure 17:
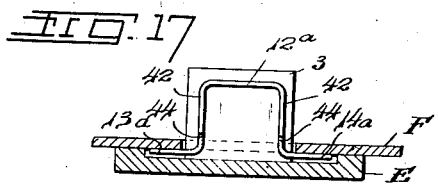
Figure 15:
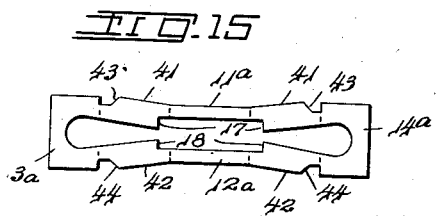
Figure 18:
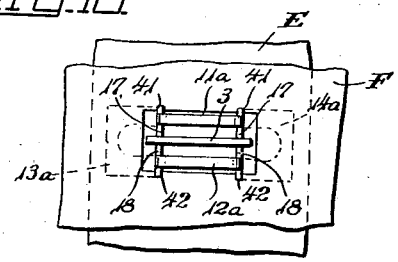

Fig. 13 is a view similar to Fig. 12 in which the securing elements of the fastener are shown provided with another form of stud engaging means;

Figs. 14 to 18 inclusive show another embodiment of the invention wherein the fastener is designed for use as an attaching or connecting device, Fig. 14 being a perspective of the fastener per se;

Fig. 15 illustrates the manner of providing the blank from which the fastener of Fig. 14 is constructed;

Fig. 16 is a sectional view of an installation embodying the fastener of Fig. 14, shown in end elevation;

Fig. 17 is a similar view in which the fastener is viewed in side elevation; and, Fig. 18 is a top plan view of Fig. 17.

Figure 19:
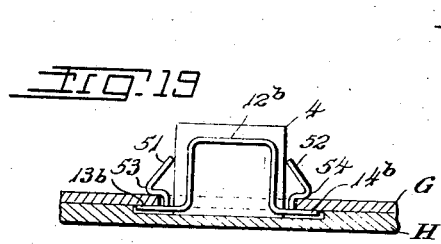
Figure 20:
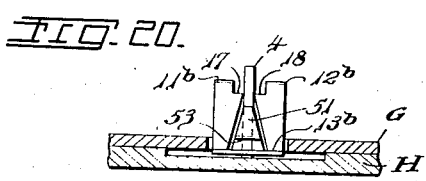
Figure 21:
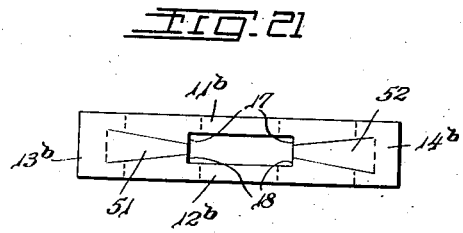
Figure 22:
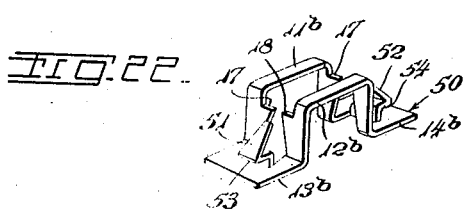

Figs. 19 to 22 inclusive disclose a further embodiment of the invention wherein another form of the fastener is employed as an attaching or connecting device, Fig. 19 being a sectional view of an installation in which the fastener is seen in side elevation;

Fig. 20 is a similar sectional view showing the fastener in end elevation;

Fig. 21 represents the manner of providing the blank from which this form of the fastener is constructed; and, Fig. 22 is a perspective of the fastener per se constructed from the blank of Fig. 21.

Referring now, more particularly, to Figs. 1 to 7 inclusive of the drawings, there is shown in Fig. 1 a simple installation embodying the improved spring fastener of the present invention as applied to the projecting free end of a connecting stud 1 for securing the superposed parts A, B in the manner of a spring nut. Said connecting stud passes through an aperture in supporting part B, and is attached to or otherwise associated with part A in any suitable manner. In the case of a molded plastic part, for example, the same would be integrally provided on the rearward face of such plastic part, and, as previously pointed out, to avoid possible imperfections such as those due to shrinkage in the area of a relatively thin portion of any such plastic part incident to the molding thereof, said connecting stud means is preferably provided in the manner of a generally flat stem or rib section. The fastener is applied with the base thereof foremost and engaging the face of the adjacent part secured in final applied fastening position as shown generally in Fig. 1. In this relation the securing elements of the fastener engage the connecting stud on opposite faces at points considerably removed from the base of the fastener and under spring forces acting generally normal to the axis of the stud in providing a pronounced and positive gripping action ensuring an effective and reliable fastening installation in a manner hereinafter more fully set forth.

A preferred form of fastener, as best seen in Fig. 2, is a simple, very inexpensive article to manufacture inasmuch as it requires few punching and forming operations and may be provided from a relatively small section of any suitable sheet metal such as spring steel or cold rolled steel. The fastener, of course, may be formed from sheet metal sections of various outlines but from a quantity production standpoint is most advantageously provided from a comparatively small, generally rectangular blank obtained from ordinary sheet metal strip stock with very little loss or waste of material. Fig. 3 shows such a blank or stamping 10 as provided with a preferred form of punched opening or cutout area presenting spaced longitudinal side sections 11, 12, and end sections 13, 14. The blank is bent into the general configuration shown in Fig. 2 in a manner whereby said side sections 11, 12, define generally U-shaped securing elements or bent spring arms provided with the end sections 13, 14, forming the base or base portions of the fastener.

The cutout area of the blank shown in Fig. 3 comprises a central generally rectangular opening and substantially bell-shaped apertures on either end thereof having angularly disposed edges 15, 16, intersecting said generally rectangular opening to define shoulders 17, 18, on the opposing inner edges of said side sections 11, 12, respectively, and extending the end walls of the cutout opening into the areas of the respective base sections 13, 14.

Accordingly, the blank thus provided is bent substantially as indicated by the dotted lines in Fig. 3 to form said side sections into intermediate bent portions defining the spaced, generally U-shaped securing elements or bent spring arms 11, 12, of the completed fastener, Fig. 2, with said end sections providing the base portions 13, 14, extending from said securing elements in any suitable manner, preferably in generally opposite directions. The blank area is thus foreshortened to the size shown in Fig. 4 and, in this relation, viewing the completed fastener from one end as in Fig. 2, the opposing inner edges 15, 16, of said side sections 11, 12 of the blank, as bent to define said U-shaped securing elements or spring arms, present inclined cam or guide surfaces which are preferably designed to provide a space therebetween in the manner of an inverted substantial V-shape tapering outwardly in the direction toward the base of the fastener defined by the end sections 13, 14.

Also in this bent configuration of the side sections 11, 12, to provide the spaced generally U-shaped securing elements or bent spring arms, the shoulders 17, 18, define anchoring means on the opposing inner edge portions thereof in the form of substantial teeth suitably spaced from the bight of such U-shaped securing elements at the approximate apices of the V-shaped cam or guide surfaces 15, 16. Said teeth 17, 18, thus provided, are rigidly disposed on the inner edges of the vertical sections of the spaced generally U-shaped securing elements 11, 12, and present small pointed edges adapted to engage opposite faces of the connecting stud applied therebetween. The generally U-shaped securing elements or spring arms 11, 12 of the completed fastener are adapted to flex or yield edgewise under force by reason of the cutout or opening therebetween and thus have a resilient spring gripping action which is of exceptional intensity due to the bent configuration of said securing elements.

As shown in Figs. 1 and 5 to 7 inclusive, a fastener of this character is admirably suited for use as a spring nut or the like applied over the projecting free end of the connecting stud 1, with the base portions 13, 14, thereof foremost and engaging adjacent part B in applied fastening position. The height of the securing elements 11, 12, from the base of the fastener is preferably less than the length of the projecting portion of the connecting stud 1 with said securing elements being applied thereto in a manner to straddle the same and engage opposite faces thereof as best seen in Fig. 6. In this relation, the base portions 13, 14 extend foremost as the clip is initially applied to the free end of the connecting stud which is otherwise received in the space between the guide edges 15, 16 of the generally U-shaped securing elements or bent spring arms 11, 12.

As stated, the spacing of said teeth 17, 18 in the normal untensioned relation of the fastener, is at least slightly less than the thickness of the connecting stud engaged thereby while the adjoining guide edges 15, 16, Fig. 6, taper outwardly therefrom in presenting a somewhat wider space between the inner edges of the securing elements adjacent the base portions 13, 14, such that the connecting stud is easily and quickly received in such space between the securing elements in the initial step of applying the fastener to fastening position on the connecting stud.

As the fastener thus initially applied to straddle the connecting stud, is pushed or otherwise advanced axially thereof to fastening position as shown in Figs. 1, 5 and 6, the inclined cam or guide surfaces 15, 16 on the opposing inner edges of the securing elements 11, 12, cause a gradual spreading of said securing elements in a manner whereby the teeth 17, 18 are readily eased over the free end of said connecting stud. Said teeth 17, 18, thereby engage the stud on its opposite faces at points removed from the free end thereof in the final applied position of the fastener, as best seen is Fig. 6, with the base portions 13, 14, of the fastener in such fastening position engaging the adjacent part B to maintain the superposed parts A, B, in secured relation. In this relation, the teeth 17, 18 engage the connecting stud at points spaced from said base portions 13, 14 and automatically provide a pronounced positive locking biting action therewith by digging into and becoming embedded in the opposite faces of said connecting stud under spring forces acting generally normal to the axis of the stud. An exceptional spring gripping action is thereby obtained and this is due primarily to the bent configuration of the generally U-shaped securing elements or spring arms 11, 12 which operate in the manner of resilient jaws, forcing said teeth, 17, 18, at all times to tenaciously resist any movement or displacement of the fastener from its proper and most effective final applied fastening position on the connecting stud.

Such biting engagement of the teeth 17, 18, of course, provides a rigid, positive locking action in fastening position in a manner whereby the fastener cannot become displaced, dislodged or even readily removed. In the event a readily removable arangement for the fastener is desired, the elements defining the teeth are provided in the manner of blunt shoulders having a substantial sliding action with the surfaces of the connecting stud engaged thereby and thus permit the fastener to be readily withdrawn while at the same time providing a firm, rigid securing action in fastening position by reason of the resilient spring gripping qualities of the U-shaped securing elements or bent spring arms 11, 12.

Fig. 8 illustrates a modified fastener construction similar to that just described but in which the base portions 13', 14', of the fastener are inclined and bent to define rounded substantial cam shoulders 23, 24, adapted to slidably engage the adjacent face of the part secured to minimize possibility of scratching or otherwise mutilating such part when the fastener is tightened thereagainst. The inclined disposition of said base portions 13', 14' permits the same to engage the adjacent part with increased resilience to serve as a yieldable take-up means whereby the juxtaposed parts are secured under continuously effective spring tension to eliminate automatically any possible looseness therebetween.

Fig. 9 shows another form of fastener construction in which either of the base portions, for example 14', is provided of such length as to include an article holding portion 25 for mounting a cable 26, rod, tube or the like, directly on the part A when the fastener is applied to the connecting stud 1 substantially in the manner of the previously described forms of the invention.

Figs. 10 to 12 inclusive illustrate another embodiment of the invention wherein the U-shaped securing elements or bent spring arms of the fastener are provided on their opposed inner edges with an alternate form of anchoring means. The fastener in this instance is constructed from the blank 30, Fig. 10, which is provided with an opening defining the side sections 31, 32 and end sections 33, 34. Said side sections have the opposing inner edges 35, 36, thereof in generally parallel relation with a space therebetween greater than the thickness of the connecting stud with which it is to be employed. Anchoring means such as teeth 37, 38 are provided on such inner edges with a spacing less than the thickness of the connecting stem and preferably include inclined cam surfaces adjacent the points thereof. Accordingly, when the blank of Fig. 10 is bent, substantially as indicated by the dotted lines, to the completed form of the fastener shown in Fig. 11, said teeth or other anchoring means are disposed on the vertical edge portions of the U-shaped securing elements or bent spring arms 31, 32. As best seen in Fig. 12, the space between the leading portions of the inner edges 35, 36, is considerably greater than the thickness of the connecting stud, thereby enabling the fastener to be applied thereto easily and quickly with the U-shaped spring arms 31, 32 in straddling relation therewith. As the fastener is advanced to fully tightened position on the connecting stud provided by a flat-faced rivet 2, for example, to secure the parts C, D, the inclined surfaces adjacent the points of the teeth 37, 38, are adapted to cam against the free end of the stud to cause a suitable spreading of the U-shaped securing elements 31, 32 sufficient to permit said teeth to be readily eased over such free end into positive biting engagement with the opposite faces of the connecting stud in the final applied position of the fastener.

The biting engagement of the teeth 37, 38, provides a rigid, positive locking action with the connecting stud to such extent that the fastener cannot become displaced, dislodged or even readily removed from the connecting stem by reason of the tenacious gripping qualities supplied by the U-shaped spring arms 31, 32, substantially in the manner of the form of the invention described with reference to Figs. 1 to 7 inclusive. However, as shown in Fig. 13, in the event a readily removable arrangement is desired in this form of the fastener, the elements defining the anchoring means on the inner edges of the U-shaped spring arms 31, 32, are provided in the manner of blunt shoulders 39, 39', respectively, having a substantial cam sliding action with the opposing faces of the connecting stem engaged thereby, and thus permit the fastener to be readily withdrawn while at the same time providing a firm, rigid securing action in fastening position by virtue of the exceptional spring gripping qualities of the generally U-shaped securing elements or bent spring arms 31, 32.

Figs. 14 to 22 inclusive show the application and use of further embodiments of the invention in which the fastener is employed as an attaching means for securing an article to an apertured supporting part in a substantial snap fastening installation requiring access only from one side of the supporting part. Such installations are particularly important in what are known as blind locations wherein a supporting part is not conveniently or readily accessible from the rearward side thereof for application of the fastener to the connecting stud of the part or article to be secured thereby, whereupon the fastening of such an installation must be capable of being carried out by an operation taking place entirely from the forward or readily accessible side of such supporting part.

Generally speaking, such forms of the fastener have particular application and use as attaching or connecting devices in holding together a pair of cooperating parts through the medium of a connecting stud means that either forms a portion of one of said parts or extends through an aperture therein. The stud together with the securing elements of the fastener is adapted to be projected through an opening in the other part with the fastener capable of providing a substantial snap fastening engagement or locking action in such opening to hold the parts in secured relation.

In this respect, the fastener may be applied in either of two ways to complete the fastening installation, as by first snapping the securing elements of the fastener into fastening position in locking engagement in the socket opening of the supporting part and then applying thereto the connecting stud on the part to be attached; or, by first assembling the fastener in anchored relation with the connecting stud on the part to be attached and then applying the assembly to the socket opening in the supporting part by stubstantial snap fastening engagement of the securing elements of the fastener to fastening position in the socket opening.

Referring now to Figs. 14 to 18 inclusive, the fastener 40, Fig. 14, is of the same general character in structure, operation and use as that described with reference to the form of Fig. 2 so far as concerns the provision of the anchoring means such as teeth 17, 18 on the inner edges of the generally U-shaped securing elements or bent spring arms 11a, 12a. If desired, alternate forms of anchoring means such as shown in Figs. 12 and 13 may be employed on the spaced inner edges of the securing elements 11a, 12a, for connecting engagement with the stud on the part to be attached substantially in the manner described. The fastener is formed from a blank provided substantially as illustrated in Fig. 15 which is similar to that of Fig. 3 but modified to the extent that the securing elements 11a, 12a, include angularly disposed outer guide surfaces 41, 42, on the respective outer edges thereof together with suitable notches presenting shoulders 43, 44, respectively, on such outer longitudinal edges adjacent the base sections 13a, 14a. In the completed form of the fastener, Fig. 14, said outer guide edges 41, 42, taper toward the leading end of the fastener to a size smaller than the engaged side walls of either a round or rectangular socket opening in the supporting part F, to be readily received therein. Such outer guide edges 41, 42, otherwise are designed to cam against the side walls of the socket opening to cause the generally U-shaped securing elements 11a, 12a, to flex and permit the fastener to be pushed to home position in which the shoulders 43, 44, cooperate with base portions 13a, 14a, to lock the fastener in the socket opening by engaging opposite sides of the supporting part F, substantially as shown in Figs. 16 and 17. In this relation, the connecting stud 3 on part E to be attached is received in the space between the opposing inner edges of the securing elements 11a, 12a, to be engaged thereby on its opposite faces by the anchoring means such as teeth 17, 18, or the like, as illustrated in Figs. 16 and 18, and substantially in the manner described with reference to the form of the invention of Figs. 1 to 7 inclusive.

Figs. 19 to 22 inclusive show another embodiment of this form of the fastener as designed for use as an attaching device in an installation such as just described. The fastener 50, Fig. 22, is constructed from a blank provided substantially as shown in Fig. 21 which is stamped in a manner to define substantial fingers 51, 52, extending from the base portions 13b, 14b, respectively, of the fastener and which present the opening in the blank defining the spaced generally U-shaped securing elements 11b, 12b, provided with anchoring means such as teeth 17, 18, on the opposing inner edges thereof similar to the fastener construction of Fig. 2.

Said fingers 51, 52, define shoulders 53, 54, respectively, designed for substantial snap fastening engagement in either a round or rectangular socket opening in the supporting part G and cooperating with base portions 13b, 14b, to engage opposite sides thereof in locking the fastener thereto substantially as shown in Fig. 19. Accordingly, the connecting stud 4 on part H to be attached is received in the space between the inner edges of the generally U-shaped securing elements 11b, 12b, Fig. 20, to be engaged thereby on its opposite faces by the anchoring means such as teeth 17, 18, or the like, substantially in the manner described with reference to the form of the invention of Figs. 1 to 7 inclusive. In this relation, the extremities of the spring fingers 51, 52 may be so designed as also to engage the connecting stud as shown in Fig. 19 to provide an added securing means therefor and otherwise increase the effectiveness of the fastening installation as a whole.

In any form, the fastener is preferably constructed of relatively thin sheet metal, the thickness thereof being selected according to service requirements and the predetermined size of the parts secured. The fasteners are most effective when provided of spring metal suitably spring tempered and heat treated to give the desired toughness or hardness, particularly in the case of fasteners which are put to heavy duty in installations where extreme vibratory motion takes place. A cheap but effective fastener may also be provided from cold rolled metal which is untempered but, of course, harder than that of the connecting stud or other element to which it is applied to provide an effective and reliable fastening installation.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A fastener comprising a sheet metal body having an opening defining spaced side sections and a base, said body being bent to define cooperating securing elements having longitudinal edges in spaced, edge to edge relation and projecting substantially normal to said base, said securing elements being adapted to receive in the space therebetween a connecting stud on a part to be secured with said base of the fastener applied foremost and adapted to be disposed adjacent a member to be secured to said part, and means adjacent the space between said longitudinal edges of the securing elements providing a gripping engagement with said connecting stud in fastening position.

2. A fastener comprising a sheet metal body having an opening defining spaced side sections and a base, said side sections having bends forming generally U-shaped securing elements provided with inner edges extending from said base in spaced, edge to edge relation, said securing elements being adapted to receive in the space therebetween a connecting stud on a part to be secured with said base of the fastener applied foremost and adapted to be disposed adjacent a member to be secured to said part, and means adjacent the space between said inner edges of the generally U-shaped securing elements providing a gripping engagement with said connecting stud in fastening position.

3. A fastener comprising a sheet metal body having an opening defining spaced side sections and a base, said body being bent to define cooperating securing elements having longitudinal edges in spaced, edge to edge relation and projecting from said base, said securing elements being adapted to receive in the space between said longitudinal edges a connecting stud on a part to be secured with said base of the fastener applied foremost and adapted to be disposed adjacent a member to be secured to said part, and means on said securing elements adjacent the space therebetween providing a gripping engagement with said connecting stud in fastening position.

4. A fastener comprising a sheet metal body having an opening defining spaced side sections and a base, said side sections having bends forming generally U-shaped securing elements provided with inner edges extending from said base in spaced, edge to edge relation, said securing elements being adapted to receive in the space between said inner edges a connecting stud on a part to be secured with said base of the fastener applied foremost and adapted to be disposed adjacent a member to be secured to said part, and means on said generally U-shaped securing elements adjacent the space therebetween providing a gripping engagement with said connecting stud in fastening position.

5. A fastener comprising a sheet metal body having an opening defining spaced side sections and a base, said body being bent to define cooperating securing elements having inner longitudinal edges in spaced, edge to edge relation and projecting from said base, said securing elements being adapted to receive in the space between said inner longitudinal edges a connecting stud on a part to be secured with said base of the fastener applied foremost and adapted to be disposed adjacent a member to be secured to said part, and means carried by said securing elements adjacent the space therebetween providing a gripping engagement with said connecting stud in fastening position, said means comprising one or more substantial shoulders on the inner longitudinal edge of at least one of said securing elements.

6. A fastener comprising a sheet metal body having an opening defining spaced side sections and a base, said side sections having bends forming generally U-shaped securing elements having inner edges extending from said base in spaced edge to edge relation, said securing elements being adapted to receive in the space between said inner edges a connecting stud on a part to be secured with said base of the fastener applied foremost and adapted to be disposed adjacent a member to be secured to said part, and means on said generally U-shaped securing elements adjacent the space therebetween providing a gripping engagement with said connecting stud in fastening position, said means comprising one or more substantial shoulders on the inner edge of at least one of said securing elements.

7. A fastener comprising a sheet metal body having an opening defining spaced side sections and a base, said body being bent to define cooperating securing elements in spaced, edge to edge relation and projecting from said base, said securing elements being adapted to receive in the space therebetween a connecting stud on a part to be secured with said base of the fastener applied foremost and adapted to be disposed adjacent a member to be secured to said part, means carried by said securing elements adjacent the space therebetween providing a gripping engagement with said connecting stud in fastening position, and means comprising an inclined substantial guide surface on the inner edge of at least one of said securing elements providing an outward taper to said space therebetween facilitating application of said securing elements to said connecting stud.

8. A fastener comprising a sheet metal body having an opening defining spaced side sections and a base, said side sections having bends forming generally U-shaped securing elements extending from said base in spaced, edge to edge relation, said securing elements being adapted to receive in the space therebetween a connecting stud on a part to be secured with said base of the fastener applied foremost and adapted to be disposed adjacent a member to be secured to said part, means on said generally U-shaped securing elements adjacent the space therebetween providing a gripping engagement with said connecting stud in fastening position, and means comprising an inclined substantial guide surface on the inner edge of at least one of said securing elements providing an outward taper to said space therebetween facilitating application of said securing elements to said connecting stud.

9. A fastener comprising a sheet metal body having an opening defining spaced side sections and a base, said side sections being bent to define cooperating securing elements extending from said base in edge to edge relation and having a space between the inner edges thereof for receiving a connecting stud, said inner edges having such spacing adjacent the base of the fastener as to readily receive the free end of said connecting stud, and means on said inner edges remote from said base adapted for gripping engagement with said connecting stud.

10. A fastener comprising a sheet metal body having an opening defining spaced side sections and a base, said side sections having bends forming generally U-shaped securing elements in edge to edge relation and having a space between the inner edges thereof for receiving a connecting stud, said inner edges of the generally U-shaped securing elements having such spacing adjacent the base of the fastener as to readily receive the free end of said connecting stud, and means on said inner edges remote from said base adapted for gripping engagement with said connecting stud.

11. A fastener comprising a sheet metal body having an opening defining spaced side sections and a base, said side sections having bends forming generally U-shaped securing elements in edge to edge relation and having a space between the inner edges thereof for receiving a connecting stud, said inner edges of the generally U-shaped securing elements having such spacing adjacent the base of the fastener as to readily receive the free end of said connecting stud, and means on said inner edges remote from said base adapted for gripping engagement with said connecting stud, said means comprising one or more substantial teeth on at least one of said securing elements.

12. A fastener comprising a sheet metal body having an opening defining spaced side sections and a base, said side sections having bends forming generally U-shaped securing elements in edge to edge relation and having a space between the inner edges thereof for receiving a connecting stud, said inner edges of the generally U-shaped securing elements having such spacing adjacent the base of the fastener as to readily receive the free end of said connecting stud, and means on said inner edges remote from said base adapted for gripping engagement with said connecting stud, said means comprising a substantial cam shoulder on at least one of said securing elements.

13. A fastener comprising a sheet metal body having an opening defining spaced side sections and a base, said body being bent to define cooperating securing elements extending from said base in edge to edge relation and having a space between the inner edges thereof for receiving a connecting stud on a part to be secured, said inner edges having such spacing adjacent the base of the fastener as to readily receive the free end of said connecting stud together with means on said inner edges remote from said base adapted for gripping engagement with said connecting stud, and means provided from the fastener body adapted for attaching the fastener in a socket opening in a member to which said part is to be secured.

14. A fastener comprising a sheet metal body having an opening defining spaced side sections and a base, said side sections having bends forming generally U-shaped securing elements in edge to edge relation and having a space between the inner edges thereof for receiving a connecting stud on a part to be secured, said inner edges of the generally U-shaped securing elements having such spacing adjacent the base of the fastener as to readily receive the free end of said connecting stud together with means on said inner edges remote from said base adapted for gripping engagement with said connecting stud, and means provided from the fastener body adapted for attaching the fastener in a socket opening in a member to which said part is to be secured.

15. A fastener comprising a sheet metal body having an opening defining spaced side sections and a base, said side sections having bends forming generally U-shaped securing elements in edge to edge relation and having a space between the inner edges thereof providing for lateral yielding movement of said securing elements and for receiving a connecting stud, and means on the outer edges of said securing elements adapted to provide a substantial snap fastening engagement thereof in a socket opening in a member.

16. A fastener comprising a sheet metal body having an opening defining spaced side sections and a base, said body being bent to define cooperating securing elements extending from said base in edge to edge relation and having a space between the inner edges thereof for receiving a connecting stud on a part to be secured, means on said inner edges of the securing elements adapted for gripping engagement with said connecting stud, and means on the outer edges of said securing elements adapted for attaching the fastener in a socket opening in a member to which said part is to be secured.

17. A fastener comprising a sheet metal body having an opening defining spaced side sections and a base, said side sections having bends forming a generally U-shaped securing elements in edge to edge relation and having a space between the inner edges thereof for receiving a connecting stud on a part to be secured, said inner edges of the generally U-shaped securing elements having such spacing adjacent the base of the fastener as to readily receive the free end of said connecting stud together with means on said inner edges remote from said base adapted for gripping engagement with said connecting stud, and means on the outer edges of said generally U-shaped securing elements adapted for attaching the fastener in a socket opening in a member to which said part is to be secured.

18. A fastener comprising a sheet metal body having an opening and slit areas defining spaced side sections, a base portion and finger elements between said side sections, said side sections having bends forming generally U-shaped securing elements in edge to edge relation and having a space between the inner edges thereof for receiving a connecting stud on a part to be secured, means on said inner edges of the securing elements adapted to provide a gripping engagement with said connecting stud, and means provided by said finger elements adapted for attaching the fastener in a socket opening in a member to which said part is to be secured.

19. A fastener comprising a sheet metal body having an opening defining spaced side sections and a base, said side sections being bent to form generally U-shaped securing elements projecting from said base in edge to edge relation and having a space between the inner edges thereof providing for edgewise yielding of said securing elements, and means on the outer edge of at least one of said securing elements adapted for substantial snap fastening engagement in a socket opening in a member.

20. A fastener comprising a sheet metal body having an opening defining spaced side sections and a base, said side sections being bent to form generally U-shaped securing elements projecting from said base in edge to edge relation and having a space between the inner edges thereof providing for edgewise yielding of said securing elements, and means on the outer edge of at least one of said securing elements adapted for substantial snap fastening engagement in a socket opening in a member, said means comprising an inclined guide surface and a shoulder cooperating with said base of the fastener to retain the same in fastening position.

21. A fastener comprising a sheet metal body having an opening defining spaced side sections and a base, said side sections being bent to form generally U-shaped securing elements projecting from said base in edge to edge relation and having a space between the inner edges thereof providing for edgewise yielding of said securing elements, and shoulders on the outer edges of said securing elements adapted for substantial snap fastening engagement in a socket opening in a member.

22. A fastener comprising a sheet metal body having an opening defining spaced side sections and a base, said side sections being bent to form generally U-shaped securing elements projecting from said base in edge to edge relation and having a space between the inner edges thereof providing for edgewise yielding of said securing elements, shoulders on the outer edges of said securing elements adapted for substantial snap fastening engagement in a socket opening in a member, and guide surfaces on said outer edges diverging toward said shoulders providing for a gradual compression of said securing elements on being applied to fastening position in said socket opening.

23. A fastener comprising a sheet metal body having an opening defining spaced side sections and a base, said side sections being bent to form generally U-shaped securing elements projecting from said base in edge to edge relation and having a space between the inner edges thereof providing for edgewise yielding of said securing elements, the outer edges of said U-shaped securing elements first diverging from adjacent the bight of the U-shape thereof and then converging toward said base of the fastener to define shoulders adapted for snap fastening engagement in a socket opening in a member.

GEORGE A. TINNERMAN.